US009822652B2

United States Patent
Sjoqvist et al.

(10) Patent No.: US 9,822,652 B2
(45) Date of Patent: Nov. 21, 2017

(54) SUPPORTING STRUCTURE FOR A GAS TURBINE ENGINE (75) Inventors: Roger Sjoqvist, Trollhattan (SE); Hakan Jakobsson, Trollhattan (SE); Dan Gustafsson, Bralanda (SE)

(73) Assignee: GKN Aerospace Sweden AB, Trollhattan (SE)

( * ) Notice: Subject to any disclaimer, the term of this patent is extended or adjusted under 35 U.S.C. 154(b) by 410 days.

(21) Appl. No.: 14/408,058

(22) PCT Filed: Jul. 3, 2012

(86) PCT No.: PCT/SE2012/000102
§ 371 (c)(1),
(2), (4) Date: Mar. 10, 2015

(87) PCT Pub. No.: WO2014/007658
PCT Pub. Date: Jan. 9, 2014

(65) Prior Publication Data
US 2015/0176420 A1 Jun. 25, 2015

(51) Int. Cl.
*F01D 9/04* (2006.01)
*F01D 25/24* (2006.01)
(Continued)

(52) U.S. Cl.
CPC .............. *F01D 9/041* (2013.01); *B23K 31/02* (2013.01); *F01D 25/246* (2013.01); *F01D 25/28* (2013.01);
(Continued)

(58) Field of Classification Search
CPC ... F01D 1/04; F01D 5/147; F01D 9/02; F01D 9/04; F01D 9/041; F01D 9/042;
(Continued)

(56) References Cited

U.S. PATENT DOCUMENTS 5,474,419 A * 12/1995 Reluzco .................. F01D 9/044
415/209.4
7,914,255 B2 * 3/2011 Workman ............... F01D 9/042
29/889.22
(Continued)

FOREIGN PATENT DOCUMENTS

| EP | 1939402 A2 | 7/2008 | |
| EP | 1953347 A2 * | 8/2008 | ......... B23K 15/0006 |
| WO | 2005116405 A1 | 12/2005 | |

OTHER PUBLICATIONS

International Search Report and Written Opinion dated Mar. 5, 2013 (12 pages).

*Primary Examiner* — Gregory Anderson
*Assistant Examiner* — Eldon Brockman
(74) *Attorney, Agent, or Firm* — Bejin Bieneman PLC (57) ABSTRACT A supporting structure for a gas turbine engine comprises an inner ring, an outer ring, and a plurality of circumferentially spaced, load carrying radial elements connecting the inner and outer rings, said radial elements being configured to transfer loads between the inner ring and the outer ring, wherein a gas channel for a primary axial gas flow is defined between the inner and outer rings, wherein the supporting structure has an inlet side for primary gas flow entrance and an outlet side for primary gas outflow, wherein the radial elements have an airfoil shape with a leading edge directed towards the inlet side, a trailing edge directed towards the outlet side, and two opposite sides connecting the leading edge and the trailing edge, and wherein at least a first of said radial elements is connected to an adjacent part of the supporting structure via a weld joint that extends across the leading edge and circumferentially at least partly around the first radial element.

18 Claims, 8 Drawing Sheets (51) Int. Cl.
*F01D 25/28* (2006.01)
*B23K 31/02* (2006.01)

(52) U.S. Cl.
CPC ... *F05D 2230/232* (2013.01); *Y10T 29/49323* (2015.01)

(58) Field of Classification Search
CPC .......... F01D 9/044; F01D 9/045; F01D 9/047; F01D 25/24; F01D 25/246; F01D 25/26; F01D 25/28
See application file for complete search history.

(56) References Cited

U.S. PATENT DOCUMENTS

| | | |
|---|---|---|
| 8,210,803 B2 | 7/2012 | Schaff et al. |
| 2007/0140845 A1 | 6/2007 | Marke et al. |
| 2007/0248455 A1* | 10/2007 | Workman ............... F01D 9/042 415/152.1 |
| 2008/0038113 A1* | 2/2008 | Matsumoto ............. F01D 5/147 415/209.4 |
| 2011/0081239 A1* | 4/2011 | Durocher ................ F01D 9/044 415/208.2 |

* cited by examiner

SUPPORTING STRUCTURE FOR A GAS TURBINE ENGINE

CROSS-REFERENCE TO RELATED APPLICATIONS

This application is a National Phase of, and claims priority to, International Application No. PCT/SE2012/000102 filed on Jul. 3, 2012, of which application is hereby incorporated herein by reference in its entirety.

BACKGROUND

An axial flow gas turbine engine, such as an aircraft "jet-engine", generally comprises an air inlet, a compressor section, a fuel combustion chamber, a turbine section, one or several rotatable drive shafts connecting corresponding compressors and turbines, an exhaust outlet and structures for supporting the drive shafts and for mounting the engine to, e.g., an aircraft.

The supporting structures are static parts that typically include an inner shell or ring, for connection to bearings and a centrally located drive shaft, and an outer shell or ring, for connection to, e.g., an engine casing, and where circumferentially distributed, load carrying airfoil shaped radial elements extend between and connect the inner and outer shells/rings. A primary axial gas flow through the engine thus flows through the areas formed between the rings and the radial elements.

The desire for low-weight components in air-craft applications has generated a need for supporting structures that are less heavy than the traditional casted structures but that still are capable of transferring radial loads, withstanding thermal load and an internal pressure, etc. Generally, such low-weight structures are manufactured by joining, typically by welding, a number of prefabricated parts together. The radial elements of such prefabricated structures usually consist of hollow airfoil shaped structural vanes. An example of a prefabricated supporting structure is shown in US 2007/140845.

A particular issue related to such prefabricated structures is the strength and durability of the joints, typically the welded joint formed when welding a first part of the vane butt to butt to a second part that forms an extension of the first part so that the welded cross-sectional connection becomes located somewhere along the radial length of the vane with the weld joint extending circumferentially around the radial element. A typical example is when the first vane part form part of a casted inner ring (hub) to which the remaining outer part of the vane and the outer ring are joined.

A supporting structure positioned in the turbine section of the gas turbine engine, such as a so-called Turbine Exhaust Case (TEC), is normally subjected to very high temperatures in the ring-strut-ring parts while being much cooler where connected to the bearing housing. This leads to a considerable thermal stress in the structure that, in combination with the considerable mechanical radial loads caused by flight manoeuvres, could limit the safe life of the welded joints, and thus of the entire component, due to thermal load driven crack propagation.

In order to increase the possibilities of making use of lighter, prefabricated supporting structures there is a desire for designs that reduce the effect of thermal stress on the life time of the component.

SUMMARY

This disclose relates to a supporting structure for a gas turbine engine, said structure comprising an inner ring, an outer ring, and a plurality of circumferentially spaced, load carrying radial elements connecting the inner and outer rings. A supporting structure can have at least a first of said radial elements connected to an adjacent part of the supporting structure via a weld joint that extends across the leading edge, reducing the stress in such a weld joint. The present disclosure also relates to a gas turbine engine comprising a supporting structure of the above type and to a method of manufacturing a supporting structure of the above type.

The prefabricated supporting structure for a gas turbine engine exhibits improved properties with regard to thermal stress and life compared to previous structures of similar type.

The disclosed supporting structure for a gas turbine engine comprises an inner ring, an outer ring, and a plurality of circumferentially spaced, load carrying radial elements connecting the inner and outer rings, said radial elements being configured to transfer loads between the inner ring and the outer ring. A gas channel for a primary axial gas flow is defined between the inner and outer rings, wherein the supporting structure has an inlet side for primary gas flow entrance and an outlet side for primary gas outflow. The radial elements have an airfoil shape with a leading edge directed towards the inlet side, a trailing edge directed towards the outlet side, and two opposite sides connecting the leading edge and the trailing edge. At least a first of said radial elements is connected to an adjacent part of the supporting structure via a weld joint that extends across the leading edge and circumferentially at least partly around the first radial element.

The first radial element is provided with a region of reduced stiffness in the vicinity of the leading edge.

Most of the radial load transferred by the supporting structure is typically concentrated to the leading edge of the radial element. An effect of providing the vicinity of the leading edge with the region of reduced stiffness is that it forms a local radial softness that re-distributes the thermal stress from the leading edge to a location further aft. Moreover, the radial load is evened out over a wider section of the vane in the same direction (i.e. downstream). Introducing such a relative softness feature locally at the leading edge of a structural fabricated vane results in a stress relief in the circumferential weld joint, in particular in the part of the weld joint positioned at the leading edge. A reduced stress in the weld joint increases the life of the joint (which typically connects the radial element to an extension part that is connected to the inner ring, the hub, or to the outer ring, the shroud). Further, a more evenly distributed load is usually desired from a weld design point of view as it is desired for wall structures to be of uniform thickness along the weld joint to eliminate spots with short lifetime.

A shorter life for the weld joint leads to shorter component/engine service intervals and thus to an increase in maintenance and cost. Extending the life of the joint thus leads to a reduction in cost.

In an embodiment the supporting structure has a lower stiffness in the region of reduced stiffness than in a region along the weld joint. This reduces the thermally induced stress in the joint.

In an embodiment the region of reduced stiffness has an elongated shape and extends along the leading edge. That is, this region extends radially along the inlet side of the radial element between the rings and provides for stress reduction along its extension.

In an embodiment the first radial element comprises a wall structure forming the leading edge and the two opposite sides, wherein a wall thickness of the wall structure is greater along the weld joint than in at least parts of the region of reduced stiffness. A pronounced effect in wall structures occurs as the load is more concentrated than in more solid structures. Varying the wall thickness is an effective way of varying the stiffness of the wall structure. Although the wall can be made locally thicker it is generally an advantage to make use of thinner walls on certain locations as this is a way to cut weight of the supporting structure and thus of the entire engine.

In an embodiment the region of reduced stiffness comprises a plurality of sub-regions with reduced wall thickness, wherein said sub-regions are distributed along the region of reduced stiffness. A plurality of low-stiffness regions can often provide for a more effective stress distribution/reduction than a single, longer region. Preferably, the sub-regions are distributed along a region of reduced thickness that has an elongated shape and extends along the leading edge.

In an embodiment all transitions between larger and thinner wall thickness as well as any corners in the region of reduced thickness are rounded and smooth. This way it is avoided that stress concentrations arise at certain points which could lead to a shorter life of the component.

In an embodiment the distance along the leading edge between an end point of the region of reduced stiffness and a center line of the weld joint is at least two times the wall thickness at the weld line or at least 5 mm (0.2 inch). Such a safety distance prevents high stress in the weld joint in most applications.

In an embodiment the thickness of the wall structure is substantially uniform except in the region of reduced stiffness, wherein the thickness outside of the region of reduced stiffness is in the interval 1-3 mm, typically around 2-2.5 mm, and wherein the wall thickness in parts of the region of reduced stiffness with reduced thickness is at least 20% lower, preferably at least 40% lower, than the thickness outside of the region of reduced stiffness.

In an embodiment the adjacent part of the supporting structure, i.e., the part connected to the first radial element via the weld joint, forms a radial extension of the first radial element, wherein the weld joint is located between the inner ring and the outer ring. The presently disclosed subject matter is in particular directed to such weld joints. Typically, the weld joint is located substantially closer to one of the rings. This is for instance the case where the radial element is welded to a protruding part of a (casted) inner ring (hub).

In an embodiment a plurality of said radial elements has a weld joint and a region of reduced stiffness according to what has been defined for the first radial element in claim 1. This way all radial elements are capable of handling the thermal stress in the same advantageous way. Further, the supporting structure can become circumferentially symmetric and exhibit the same mechanical properties in all directions.

Also disclosed is a gas turbine engine comprising a supporting structure of the above type. In an embodiment, the gas turbine engine is arranged for propulsion of an aircraft.

Yet further disclosed is a method for manufacturing a supporting structure of the type where the first radial element comprises a wall structure forming the leading edge and the two opposite sides, and wherein a wall thickness of the wall structure is greater along the weld joint than in at least parts of the region of reduced stiffness. In its general form this method comprises the steps of: providing a substantially flat wall structure; forming the region of reduced stiffness in the substantially flat wall structure; and forming the substantially flat wall structure into at least an inlet side portion of the first radial element comprising the leading edge and at least a portion of each of the two opposite sides.

Accordingly, the entire radial element, or at least an inlet side portion of it, is formed from a substantially flat wall structure that is shaped (bent) such as to form the leading edge and at least a portion of each of the two opposite sides. The region of reduced stiffness can thus be formed on the flat wall structure, e.g., by milling, in a position intended to located at the leading edge after shaping of the wall structure. This is an easy and effective method of producing a radial element with a reduced wall thickness in a region in a vicinity of the leading edge.

Typically, the method includes the steps of forming the two opposite sides and connecting them, preferably by welding, along the trailing edge.

In an embodiment, at least one of the two opposite sides form part of the substantially flat wall structure. This means that at least one of the sides already forms part of the inlet side portion of the radial element and needs only to be properly bent and shaped. Preferably, both sides form part of the substantially flat wall structure in order to reduce the number of connection operations. In such a case only the joining at the trailing edge is required (besides the joining of the entire radial element to an adjacent part of the supporting structure).

In another embodiment, at least one of the two opposite sides comprises at least one remaining portion, wherein the method comprises the step of connecting the inlet side portion of the first radial element to the corresponding at least one remaining portion of the at least one opposite side. Such a connection typically results in a further weld joint extending substantially parallel to, and at some distance from, the leading edge. Such a weld joint is not exposed to the high stress discussed above as it is not located in the leading edge. If it is difficult to shape one or both sides from the flat wall structure, the option of connecting separate remaining parts of one or both sides to the inlet side portion of the radial element is useful.

BRIEF DESCRIPTION OF DRAWINGS

In the description given below reference is made to the following figure, in which.

DESCRIPTION OF EXAMPLE EMBODIMENTS

Figure 1:
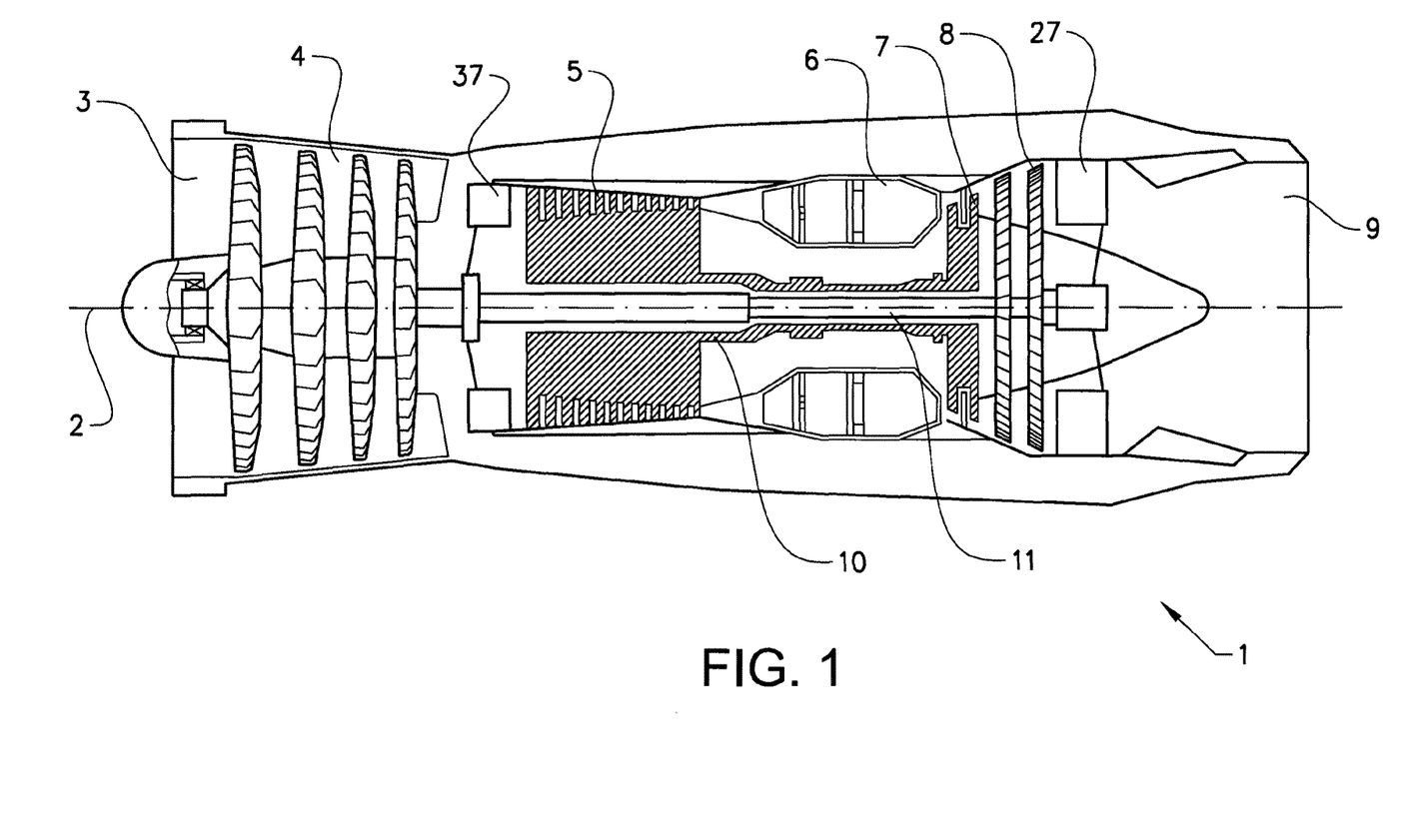
FIG. 1 shows, in a schematic overview, an example of an axial flow aircraft gas turbine engine provided with a supporting structure.

FIG. 1 shows, in a schematic overview, an axial flow aircraft gas turbine engine 1 provided with supporting structures 27, 37. In general, the gas turbine engine 1 shown in FIG. 1 is of conventional construction and comprises, in axial flow series, an air intake 3, a low pressure compressor 4, a high pressure compressor 5, combustion equipment 6, a high pressure turbine 7, a low pressure turbine 8 and an exhaust outlet 9. During operation, the high pressure compressor 5 is driven by the high pressure turbine 7 via a first hollow shaft, the high pressure (HP) turbine shaft 10. Similarly, the low pressure compressor 4 is driven by the low pressure turbine 8 via a second hollow shaft, the low pressure (LP) turbine shaft 11, which is coaxially disposed within the first turbine shaft 10. A common axis 2 is also shown.

The gas turbine engine 1 operates, in general, in a conventional manner whereby air drawn in through the air intake 3 is compressed by the low pressure compressor 4 before passing into the high pressure compressor 5 where it is further compressed. The compressed air then flows into the combustion equipment 6 where it is mixed with fuel and the mixture combusted. The resultant hot combustion products then expand through the high and low pressure turbines 7, 8 before being exhausted to the atmosphere through the exhaust outlet 9.

The engine 1 comprises a rear supporting structure 27 and a front supporting structure 37 for supporting the drive shafts and for mounting the engine to an aircraft.

The following description is provided with reference to the rear supporting structure 27. Such a supporting structure is commonly referred to as Turbine Rear Frame (TRF), Turbine Exhaust Case or Tail Bearing Housing.

Generally, rear support structures in jet engines support one or two shafts by means of roller and/or ball bearings, i.e. only radial load is transmitted through the structure (axial load only at shaft fwd bearing). The load is transmitted through an inner support structure (support cone) to an inner hub connected to an outer structure (shroud) by means of radial elements. In order to reduce aerodynamic drag and to straighten the outlet angle of the main gas flow leaving the low pressure turbine, these elements are usually covered with an airfoil structure or made integral to the structure. Integrated airfoils or vanes are sometimes denoted "struts". In the example described below the term structural vanes is used. Structural vanes are capable of supporting both aerodynamic loads as well as a combination of structural and thermally induced loads. Most of the modern jet engines utilize such vanes in ring-vane-ring components, such as the rear supporting structure 27.

Figure 2:
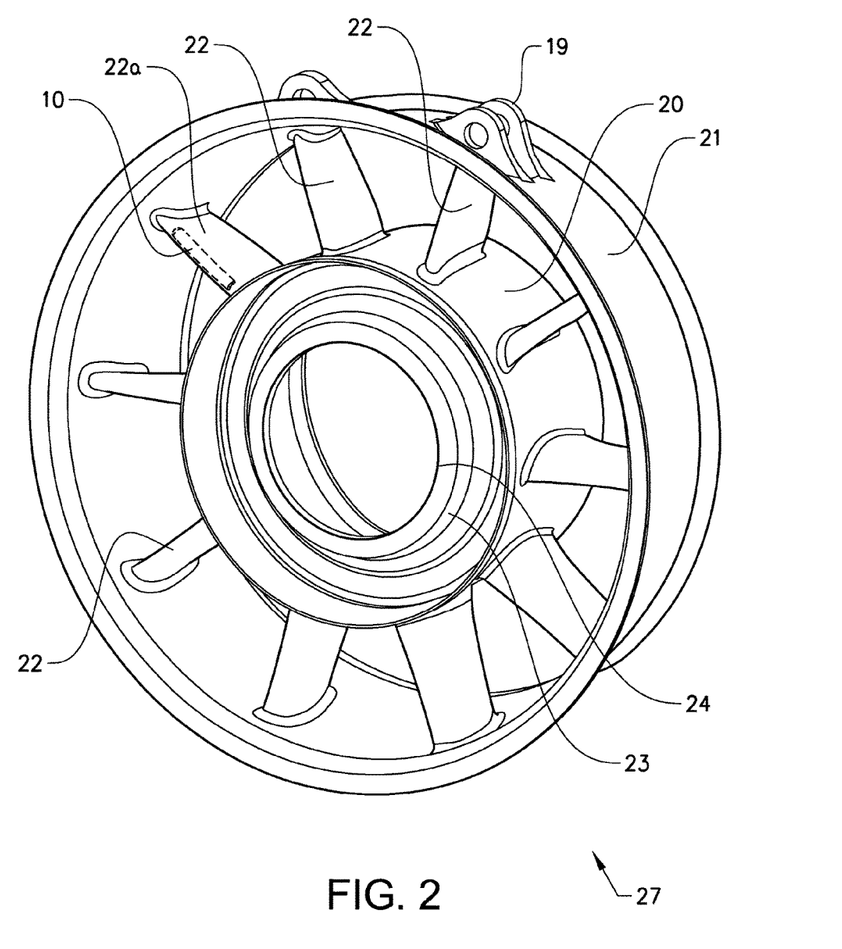
FIG. 2 shows, in a perspective front view, an embodiment of a supporting structure.

FIG. 2 shows a perspective front view of an inlet side of an embodiment of the rear supporting structure 27. This structure 27 comprises an inner annular member or ring 20 in the form of an inner housing or hub for receiving the second turbine drive shaft 11 and an outer annular member or ring 21, wherein the two annular members 20, 21 are concentrically arranged around the common axis 2. The supporting structure 27 further comprises a plurality of circumferentially spaced elements, structural vanes 22, that extend in a radial direction and connect the inner and outer annular members 20, 21. The vanes 22 define gas flow passages for a primary axial gas flow between the rings 20, 21 and, in the example shown, each radial element 22 has an airfoil shape in cross section and is structurally integrated in the supporting structure 27. FIG. 2 shows a gas inlet side for primary gas flow entrance to the component 27. Accordingly, an outlet side for primary gas outflow is formed on the backside of the structure 27. FIG. 2 further indicates a first element/vane 22a provided with a region of reduced stiffness 10 as will be described further below.

An annular load transfer structure 23 is positioned internally of the inner ring 20 for transferring loads between the elements 22 and a bearing structure 24 for the turbine shaft 11 which is positioned centrally in the component 27. The exemplified supporting structure 27 further comprises engine mounts 19 for fastening of the gas turbine engine 1 to an aircraft. The radial elements 22 are thus load carrying components and are configured to transfer loads between the inner ring 20 and the outer ring 21.

Figure 4:
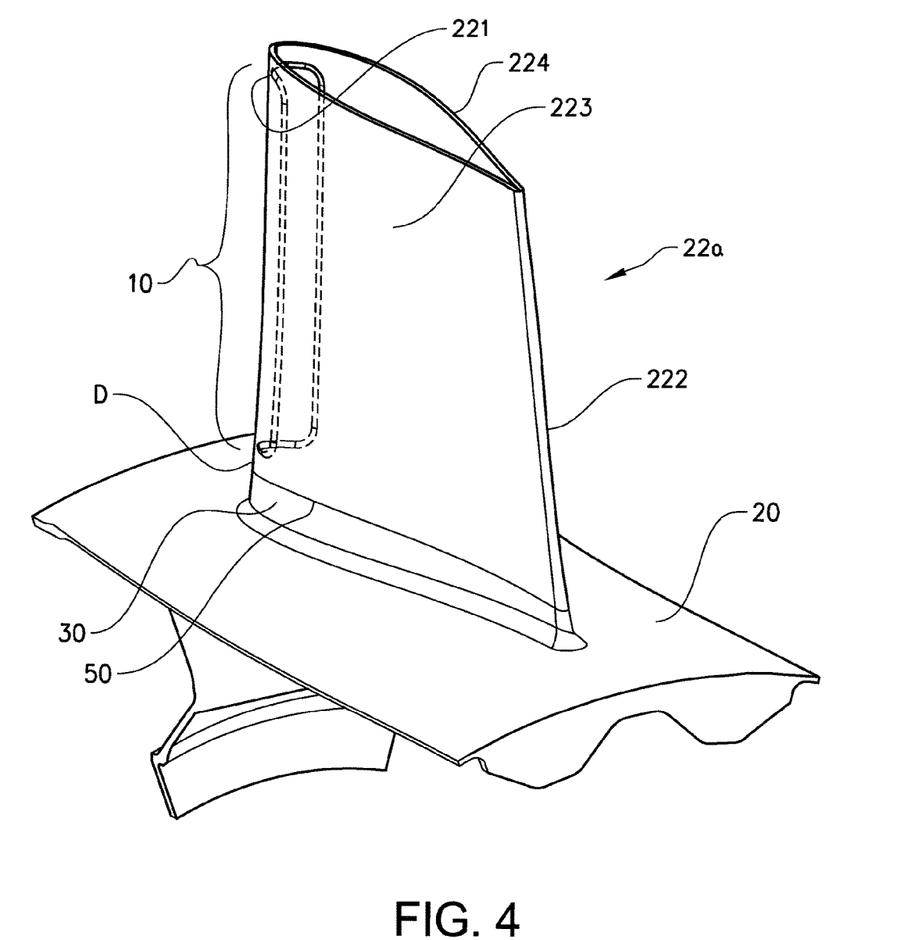
FIG. 4 shows another view of the detail shown in FIG. 3.

The radial elements 22 have an airfoil shape with a leading edge 221 directed towards the inlet side, a trailing edge 222 directed towards the outlet side, and two opposite sides 223, 224 connecting the leading edge 221 and the trailing edge 222 (see FIG. 4). The locus of points midway between the two opposite sides 223, 224 forms a mean camber line of each radial element 22.

The supporting structure 27 will now be described with reference to FIGS. 3-5. Several radial elements 22 are in this example provided with a similar region of reduced stiffness 10 but this region is only indicated for the first element 22a and the description below therefore focus on the first element 22a.

The first radial element 22a is connected to an adjacent part 30 of the supporting structure 27 via a weld joint 50 that extends across the leading edge 221 and circumferentially around the first radial element 22a. The weld joint 50 is indicated by a weld line positioned in the center of the joint. The adjacent part 30 forms a radial extension of the first radial element 22a and the weld joint 50 is thus located between the inner ring 20 and the outer ring 21, substantially closer to the inner ring 20. As can be seen in FIG. 4 the weld joint extends around the first element 22a in a path some, roughly constant, distance from the inner ring 20.

The adjacent part 30 is connected to the inner ring 20. In this example the adjacent part 30 forms part of an inner, casted part that includes both the inner ring and a number of similar adjacent parts 30 forming extensions and connection points for all radial elements 22. A similar design may be arranged at the other end of the radial elements 22 in the vicinity of the outer ring 21, including for instance an outer weld joint that connects the elements 22 to an additional adjacent part and further to the outer ring 21 and that extends in a similar way as the weld joint 50.

Figure 3:
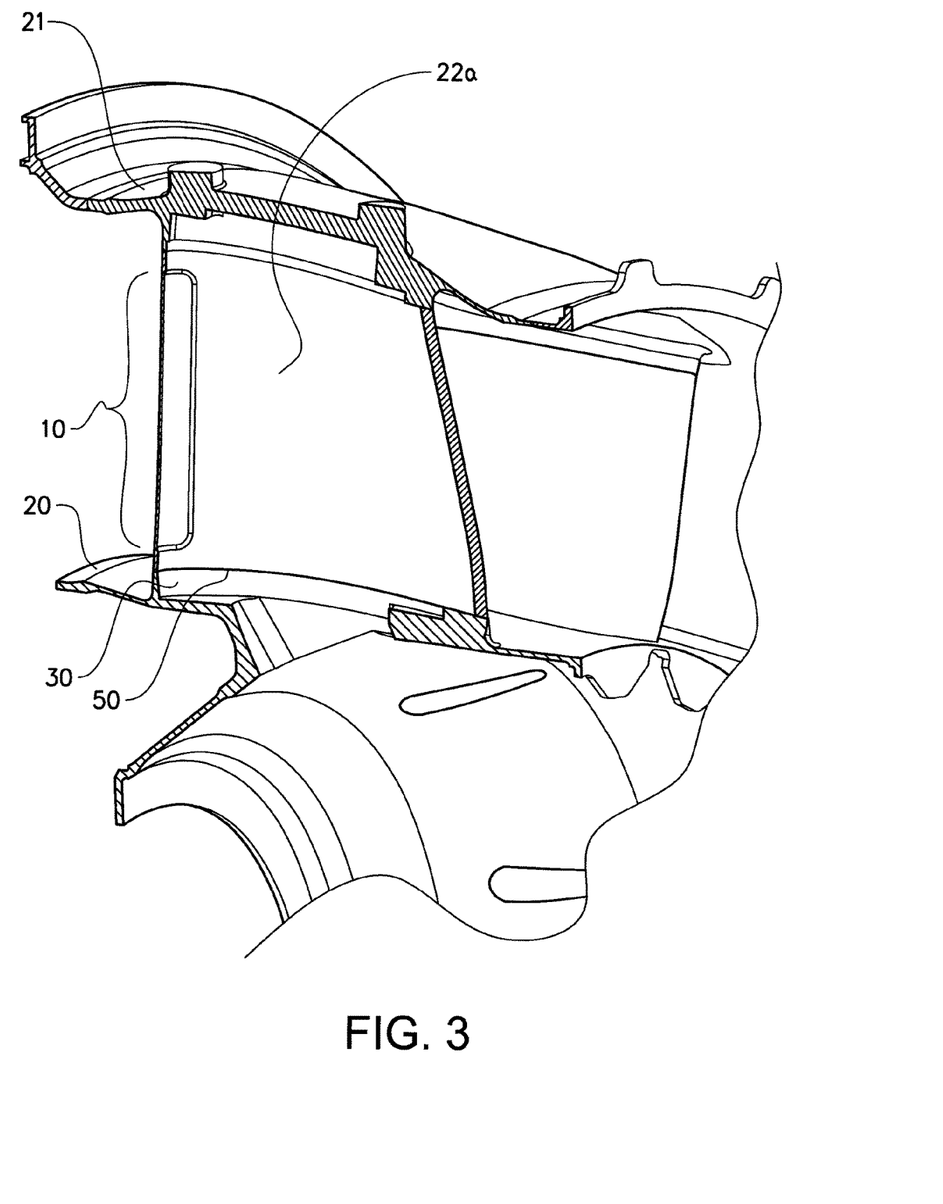
FIG. 3 shows a detail of the embodiment according to FIG. 2.
Figure 5:
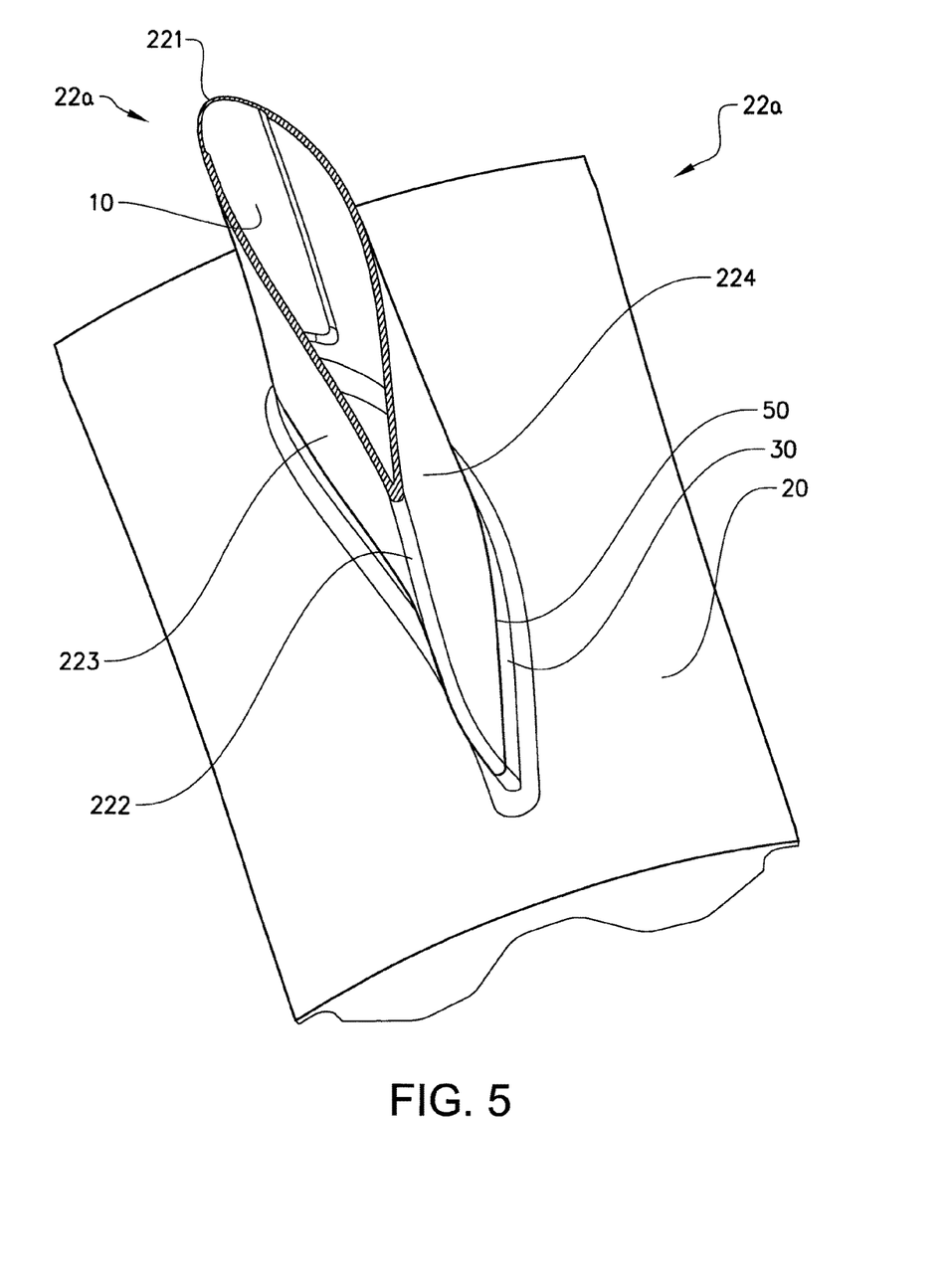
FIG. 5 shows still another view of the detail shown in FIG. 3.

As shown in FIGS. 3-5 the first radial element 22a comprises a wall structure that forms the leading edge 221 and the two opposite sides 223, 224. The element 22a is thus a hollow component. The sides 223, 224 are joined together at the outlet side of the structure 27 as to form the trailing edge 222.

The thickness of the wall structure is greater along the weld joint 50 than in the region of reduced stiffness 10. In this example the thickness of the wall structure is substantially uniform all over the element 22a except in the region of reduced stiffness, where the wall thickness has been reduced. This can clearly be seen in FIG. 5 where a cross section taken substantially parallel to the weld line 50 shows that the wall thickness is less in the region of reduced stiffness 10. In this example the general thickness of the wall structure is 2 mm (millimeters), whereas the thickness in the region of reduced stiffness 10 is 1 mm.

As shown in FIGS. 2-5, the region of reduced stiffness 10 is arranged in the vicinity of the leading edge 221 and has an elongated shape and extends along the leading edge 221 in a radial direction between the inner and outer rings 20, 21.

A main effect of reducing the wall thickness in the vicinity of the leading edge 221 is that the supporting structure 27, or more exact the first element 22a, achieves a lower radial stiffness in this region 10 than in another region along the weld joint 50. As described above, this leads to a reduced stress in the weld joint 50 and in particular in the part of the weld joint 50 crossing the leading edge 221.

All transitions between larger and thinner wall thickness as well as the corners in areas with reduced thickness are rounded and smooth.

The distance along the leading edge 221 between an end point of the region of reduced stiffness 10 and the center line of the weld joint 50 is at least two times the wall thickness at the weld line or at least 5 mm (0.2 inch). This distance forms a security distance and its position is indicated with the letter D in FIG. 4 (and in FIG. 7). The distance D is thus the minimum radial distance between the center of the weld line 50 and the closest area with reduced wall thickness.

Figure 6:
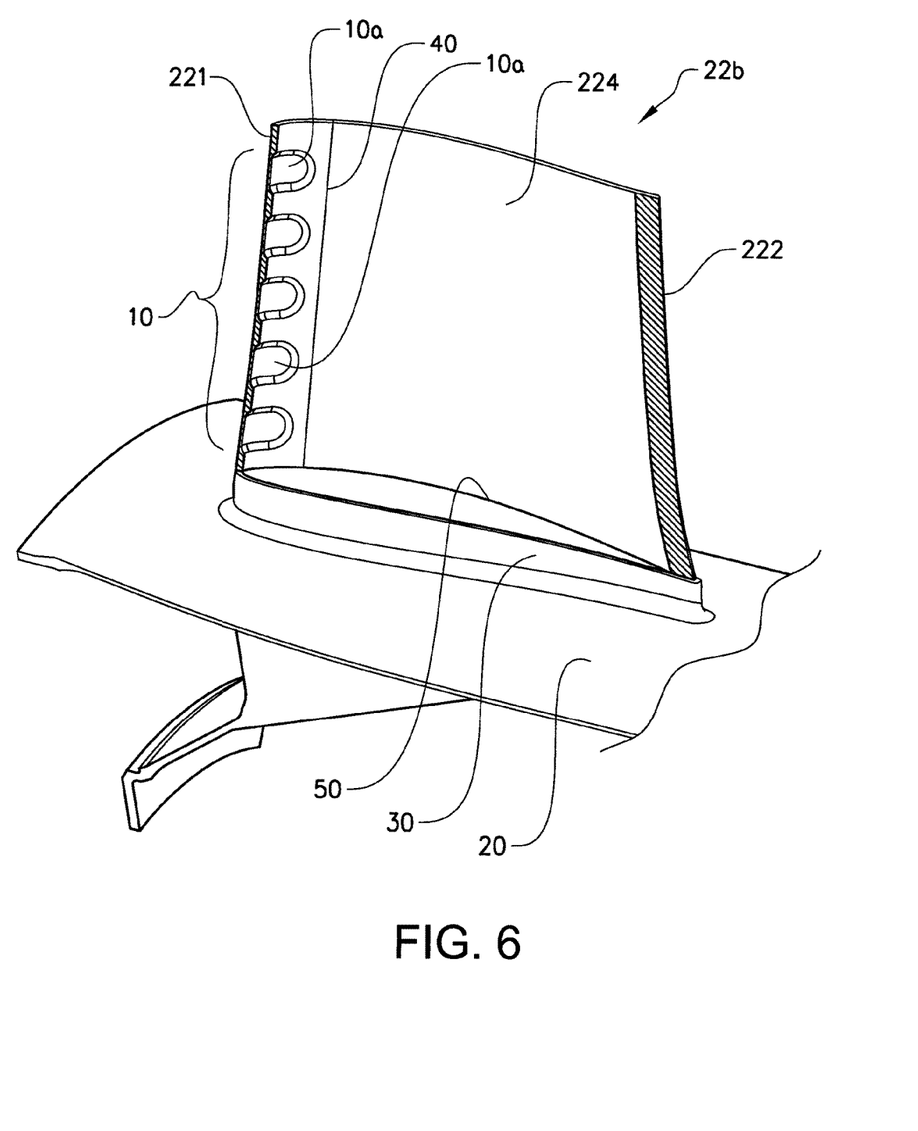
FIG. 6 shows a variant of the detail shown in FIG. 3.
Figure 7:
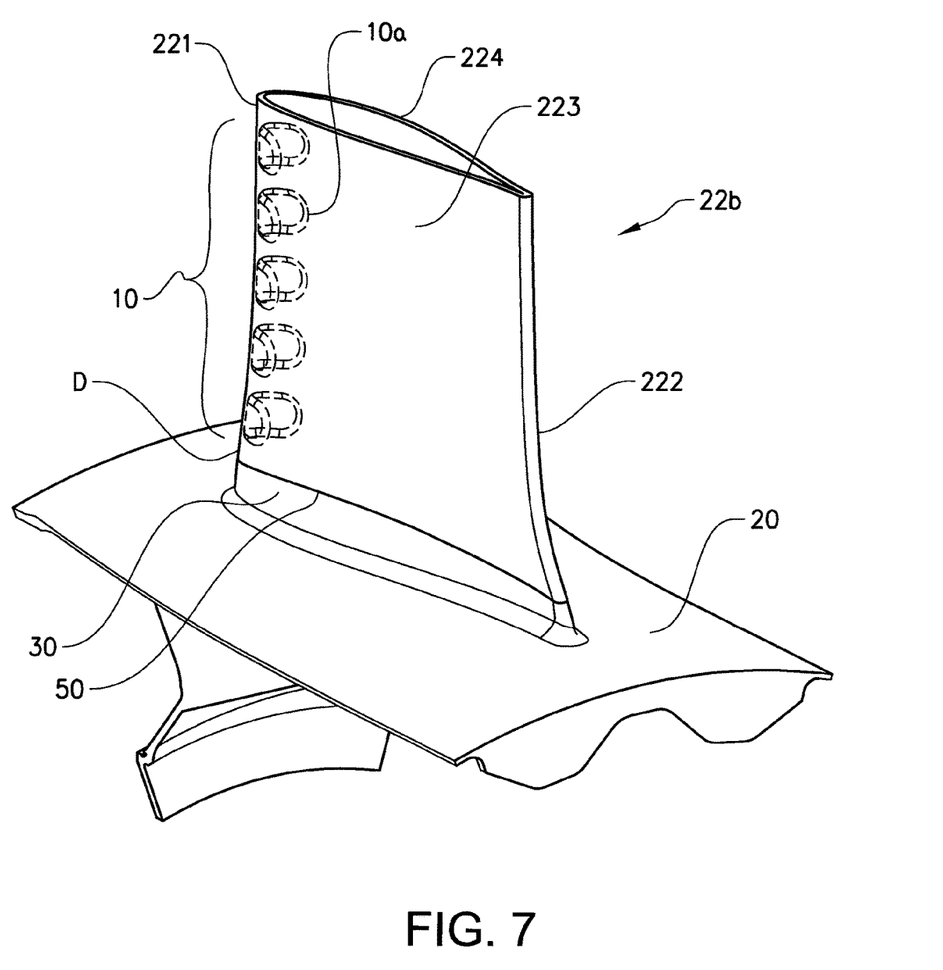
FIG. 7 shows another view of the detail shown in FIG. 6.
Figure 8:
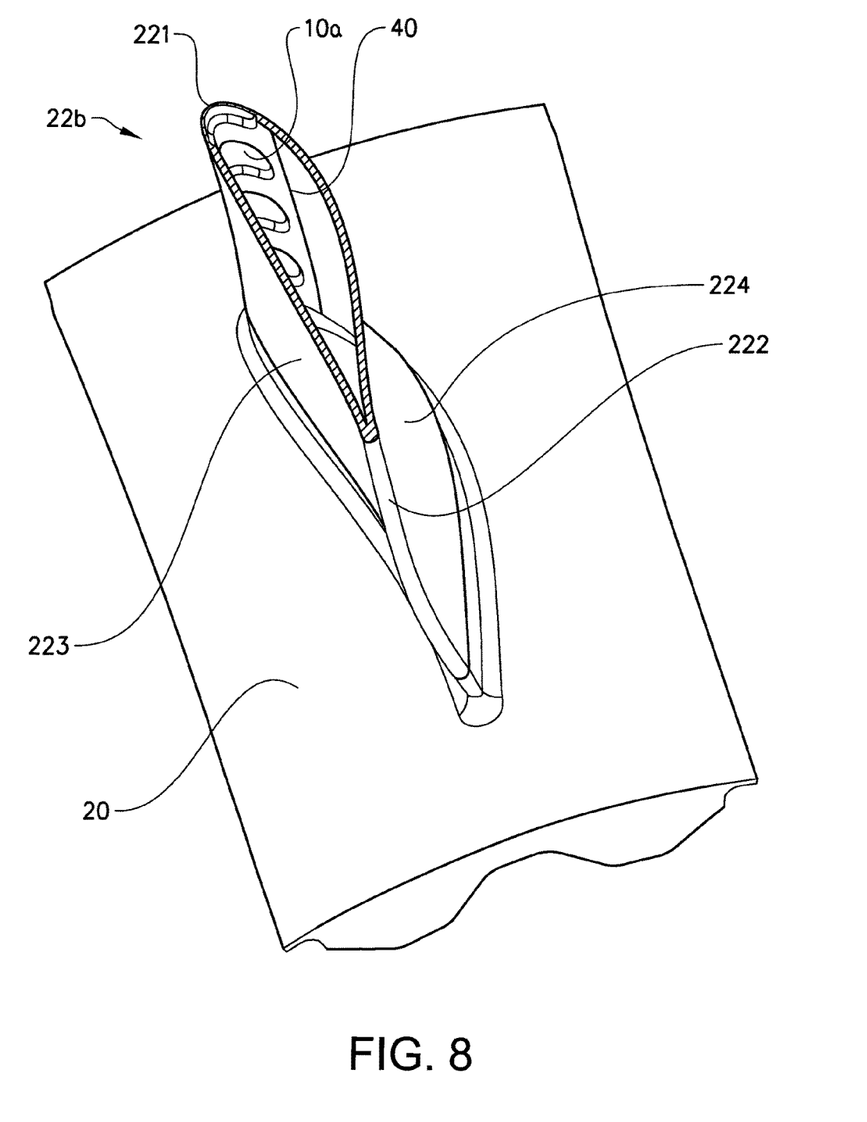
FIG. 8 shows still another view of the detail shown in FIG. 6.

FIGS. 6-8 show another variant of the design of the region of reduced stiffness 10. The first element is now denoted 22b. The main difference from what is described above regarding element 22a is that the region of reduced stiffness 10 comprises a plurality of sub-regions 10a with reduced wall thickness. These sub-regions 10a are distributed along the leading edge 221 as to form the elongated region of reduced stiffness 10. In this example there are five sub-regions 10a. The number and distribution pattern of the sub-regions 10a can be varied.

In the example shown in FIGS. 6-8 the general thickness of the wall structure is 2 mm, whereas the thickness in each of the sub-regions 10a with reduced thickness (and stiffness) is 1.5 mm.

FIGS. 6-8 also show a further weld joint/line 40 that extends approximately in parallel to the leading edges 221, and approximately perpendicular to the weld joint 50, at a distance from the leading edge 221 along the side wall 224. This side weld joint 40 is not related to the region of reduced stiffness 10 in the same way as the weld joint 50 but is a result of an example of a method for producing the element 22b as will be described below. The method of production of the elements 22 is not strictly connected to the design of the region of reduced stiffness 10 which means that the weld line 40 instead could have been shown in FIGS. 3-5. Further, the weld line 40 could have been indicated in the other side wall 223 instead, or in both sides 223, 224.

A method for manufacturing a supporting structure 27 having a wall structure radial element 22 as described above can comprise the following steps:
  providing a substantially flat wall structure,
  forming the region of reduced stiffness 10 in the substantially flat wall structure by forming one or several sub-regions 10a with reduced wall thickness, e.g. by milling,
  forming the substantially flat wall structure, at least an inlet side portion of the first radial element 22a, 22b comprising the leading edge 221 and at least a portion of each of the two opposite sides 223, 224, and
  forming the two opposite sides 223, 224 and connecting them by welding along the trailing edge 222.

In the example shown in FIGS. 3-5 both the entire opposite sides 223, 224 form part of the substantially flat wall structure. Both sides are thus formed by shaping/bending the flat wall structure.

In the example shown in FIGS. 6-8, the entire side wall 223 forms part of the flat wall structure but only a forward part of the other side wall 224 forms part of the flat wall structure. These parts form the inlet side portion of the first radial element 22a, 22b comprising the leading edge 221 and at least a portion of each of the two opposite sides 223, 224. Thus, the side wall 224 comprises a remaining portion, and this remaining portion is welded to the forward part along the weld line 40. Thus, in this case the method comprises the step of connecting the inlet side portion of the first radial element 22a, 22b to the corresponding remaining portion of the at least one opposite side 224.

The method preferably also includes the step of connecting the first of said radial elements 22a, 22b to an adjacent part of the supporting structure 27 by welding such as to form said weld joint 50.

A general intention with respect to the subject matter disclosed herein is thus to introduce features in the leading edge zone of a structural fabricated vane such that there is a stress relief in the weld connecting vane to hub or to shroud aiming to increase life in these welds. The more inclination of the vane (the angle between engine axial direction and aero flow direction) the more load will, in a ring-strut-ring configuration, be transferred through the leading edge zone of the vane when subjected to thermal loads, hence a leading edge stress relief feature is more beneficial to the weld life for such designs.

The term radial elements should be interpreted such that the elements extend between an inner ring and an outer ring in a direction that is generally radial (with reference to an axial flow gas turbine engine). The radial elements may be inclined to the true radial direction.

The supporting structure 27 is produced by welding at least two parts together, wherein at least the first radial element 22a, 22b has a weld joint 50 that extends circumferentially around the first radial element 22a, 22b along the opposite sides 223, 224 and across the leading edge 221.

The invention is not limited by the embodiments described above but can be modified in various ways within the scope of the claims. For instance, the supporting structure provided with the region(s) of reduced stiffness does not necessarily have to be positioned downstream of the combustion equipment as exemplified above. Further, more than one supporting structure can comprise such regions. Further, the supporting structure can be applied to other types of gas turbine engines than the one exemplified in FIG. 1. The design of the region of reduced stiffness may vary among the radial elements of the same supporting structure.

The invention claimed is:

1. A supporting structure for a gas turbine engine, comprising:
  an inner ring;
  an outer ring;
  a plurality of circumferentially spaced, load carrying radial elements connecting the inner and outer rings, said radial elements being configured to transfer loads between the inner ring and the outer ring; and
  a gas channel for a primary axial gas flow defined between the inner and outer rings, wherein the supporting structure has an inlet side for primary gas flow entrance and an outlet side for primary gas outflow;
  wherein the radial elements have an airfoil shape with a leading edge directed towards the inlet side, a trailing edge directed towards the outlet side, and two opposite sides connecting the leading edge and the trailing edge;
  at least a first of said radial elements is connected to an adjacent part of the supporting structure via a weld joint that extends across the leading edge and circumferentially at least partly around the first radial element;
  the first radial element is provided with a region of reduced stiffness in a vicinity of the leading edge; and
  the first radial element is hollow and comprises a wall structure forming the leading edge and the two opposite sides, wherein a wall thickness of the wall structure is greater along the weld joint than in at least parts of the region of reduced stiffness.

2. The supporting structure of claim 1, wherein the supporting structure has a lower stiffness in the region of reduced stiffness than in a region along the weld joint.

3. The supporting structure of claim 1, wherein the region of reduced stiffness has an elongated shape and extends along the leading edge.

4. The supporting structure of claim 1, wherein the region of reduced stiffness comprises a plurality of sub-regions with reduced wall thickness, wherein said sub-regions are distributed along the region of reduced stiffness.

5. The supporting structure of claim 1, wherein all transitions between larger and thinner wall thickness as well as corners in the region of reduced thickness are rounded and smooth.

6. The supporting structure of claim 1, wherein a distance along the leading edge between an end point of the region of reduced stiffness and a center line of the weld joint is at least two times the wall thickness at the weld line or at least 5 millimeters.

7. The supporting structure of claim 1, wherein the thickness of the wall structure is substantially uniform except in the region of reduced stiffness, wherein the thickness outside of the region of reduced stiffness is in a range of 1-3 millimeters, and wherein the wall thickness in parts of the region of reduced stiffness with reduced thickness is at least twenty percent lower than the thickness outside of the region of reduced stiffness.

8. The supporting structure of claim 1, wherein the adjacent part of the supporting structure that is connected to the first radial element via the weld joint forms a radial extension of the first radial element, wherein the weld joint is located between the inner ring and the outer ring.

9. The supporting structure of claim 8, wherein the weld joint is located substantially closer to one of the rings than the other one of the rings.

10. The supporting structure of claim 1, further comprising an annular load transfer structure arranged inside of the inner ring for transferring loads between said elements, and a bearing structure for a turbine shaft positioned centrally in the supporting structure.

11. A gas turbine engine, comprising a supporting structure, the supporting structure comprising:
    an inner ring;
    an outer ring;
    a plurality of circumferentially spaced, load carrying radial elements connecting the inner and outer rings, said radial elements being configured to transfer loads between the inner ring and the outer ring; and
    a gas channel for a primary axial gas flow defined between the inner and outer rings, wherein the supporting structure has an inlet side for primary gas flow entrance and an outlet side for primary gas outflow;
    wherein the radial elements have an airfoil shape with a leading edge directed towards the inlet side, a trailing edge directed towards the outlet side, and two opposite sides connecting the leading edge and the trailing edge;
    at least a first of said radial elements is connected to an adjacent part of the supporting structure via a weld joint that extends across the leading edge and circumferentially at least partly around the first radial element; and
    the first radial element is provided with a region of reduced stiffness in a vicinity of the leading edge; and
    the first radial element is hollow and comprises a wall structure forming the leading edge and the two opposite sides, wherein a wall thickness of the wall structure is greater along the weld joint than in at least parts of the region of reduced stiffness.

12. The gas turbine engine of claim 11, arranged for propulsion of an aircraft.

13. A method for manufacturing a supporting structure that comprises an inner ring; an outer ring; a plurality of circumferentially spaced, load carrying radial elements connecting the inner and outer rings, said radial elements being configured to transfer loads between the inner ring and the outer ring; and a gas channel for a primary axial gas flow defined between the inner and outer rings, wherein the supporting structure has an inlet side for primary gas flow entrance and an outlet side for primary gas outflow; wherein the radial elements have an airfoil shape with a leading edge directed towards the inlet side, a trailing edge directed towards the outlet side, and two opposite sides connecting the leading edge and the trailing edge;
    at least a first of said radial elements is connected to an adjacent part of the supporting structure via a weld joint that extends across the leading edge and circumferentially at least partly around the first radial element;
    the first radial element is provided with a region of reduced stiffness in a vicinity of the leading edge; and wherein the first radial element comprises a wall structure forming the leading edge and the two opposite sides, wherein a wall thickness of the wall structure is greater along the weld joint than in at least parts of the region of reduced stiffness; the method comprising:
    providing a substantially flat wall structure,
    forming the region of reduced stiffness in the substantially flat wall structure, and
    forming the substantially flat wall structure into at least an inlet side portion of the first radial element comprising the leading edge and at least a portion of each of the two opposite sides.

14. The method of claim 13,
characterized in
that it comprises the steps of forming the two opposite sides and connecting them along the trailing edge.

15. The method of claim 13, wherein at least one of the two opposite sides form part of the substantially flat wall structure.

16. The method of claim 13, wherein at least one of the two opposite sides comprises at least one remaining portion, wherein the method further comprises connecting the inlet side portion of the first radial element to the corresponding at least one remaining portion of the at least one opposite side.

17. The method of claim 13, wherein the step of forming the region of reduced stiffness comprises the step of forming one or several sub-regions with reduced a wall thickness.

18. The method of claim 13, further comprising connecting the first of said radial elements to an adjacent part of the supporting structure by welding such as to form said weld joint.

* * * * *

UNITED STATES PATENT AND TRADEMARK OFFICE
CERTIFICATE OF CORRECTION

PATENT NO. : 9,822,652 B2
APPLICATION NO. : 14/408058
DATED : November 21, 2017
INVENTOR(S) : Roger Sjoqvist, Hakan Jakobsson and Dan Gustafsson It is certified that error appears in the above-identified patent and that said Letters Patent is hereby corrected as shown below:

In the Claims

Column 10, in Line 56, in Claim 17: replace "with reduced a wall thickness" with -- with a reduced wall thickness --.

Signed and Sealed this
Thirteenth Day of February, 2018

Andrei Iancu
*Director of the United States Patent and Trademark Office*